United States Patent [19]

Assaf

[11] 4,336,999
[45] Jun. 29, 1982

[54] SELECTIVE MIXER FOR SOLAR POND AND METHOD OF USING SAME

[75] Inventor: Gad Assaf, Rehovot, Israel

[73] Assignee: Solmat Systems, Ltd., Yavne, Israel

[21] Appl. No.: 149,564

[22] Filed: May 14, 1980

Related U.S. Application Data

[63] Continuation-in-part of Ser. No. 889,987, Mar. 24, 1978, abandoned.

[51] Int. Cl.³ .......................... B01F 5/12; B01F 13/02
[52] U.S. Cl. .................................. 366/101; 126/415; 366/262
[58] Field of Search ............... 366/262, 263, 264, 265, 366/266, 267, 268, 269, 270, 101; 126/415, 452, 271, 416

[56] References Cited

U.S. PATENT DOCUMENTS

| | | | |
|---|---|---|---|
| 952,222 | 3/1910 | Towne | 366/107 |
| 1,026,578 | 5/1912 | Hammond | 366/262 |
| 1,762,950 | 6/1930 | Beers | 366/270 |
| 1,939,101 | 12/1933 | Bingham | 366/265 |
| 2,530,814 | 11/1950 | Becze | 366/270 |
| 2,879,542 | 3/1959 | Haley | 366/262 |
| 2,891,675 | 6/1959 | Kaplon | 366/270 |
| 3,372,691 | 3/1968 | Shachar | 126/452 |
| 3,434,698 | 3/1969 | Smith | 366/148 |

FOREIGN PATENT DOCUMENTS

| | | | |
|---|---|---|---|
| 236337 | 11/1961 | Australia | 126/271 |
| 1199169 | 7/1970 | United Kingdom | 366/262 |

OTHER PUBLICATIONS

Assaf, G. *The Dead Sea: A Scheme For A Solar Lake* in Solar Energy, vol. 18, pp. 293-299, Pergamon Press 1976.

*Primary Examiner*—Robert W. Jenkins
*Attorney, Agent, or Firm*—Sandler & Greenblum

[57] ABSTRACT

The density profile of a halocline, which increases monotonically with depth, is modified by drawing water from different levels of the halocline (and therefore of different densities) into a mixing chamber, mixing the water in the mixing chamber and discharging the water in the mixing chamber into the halocline intermediate the levels from which the water is drawn. In one technique, a closed chamber is inserted into the halocline, the chamber having a vertically oriented slot defining a preselected layer of the halocline. The contents of the chamber are mixed to establish a uniform density equal to the average density of the water in the preselected layer. As a consequence, the vertical variation in density across the slot between the water inside and outside the chamber establishes a static pressure differential which causes water in the layer to flow into and out of the chamber until the density of the layer is uniform. In another technique, water is pumped into a mixing chamber from two different levels in the halocline and discharged into the halocline intermediate the levels from which the water is drawn. With this arrangement, the density of the water in the mixing chamber can be adjusted in accordance with the relative amount of water pumped from each level.

45 Claims, 18 Drawing Figures

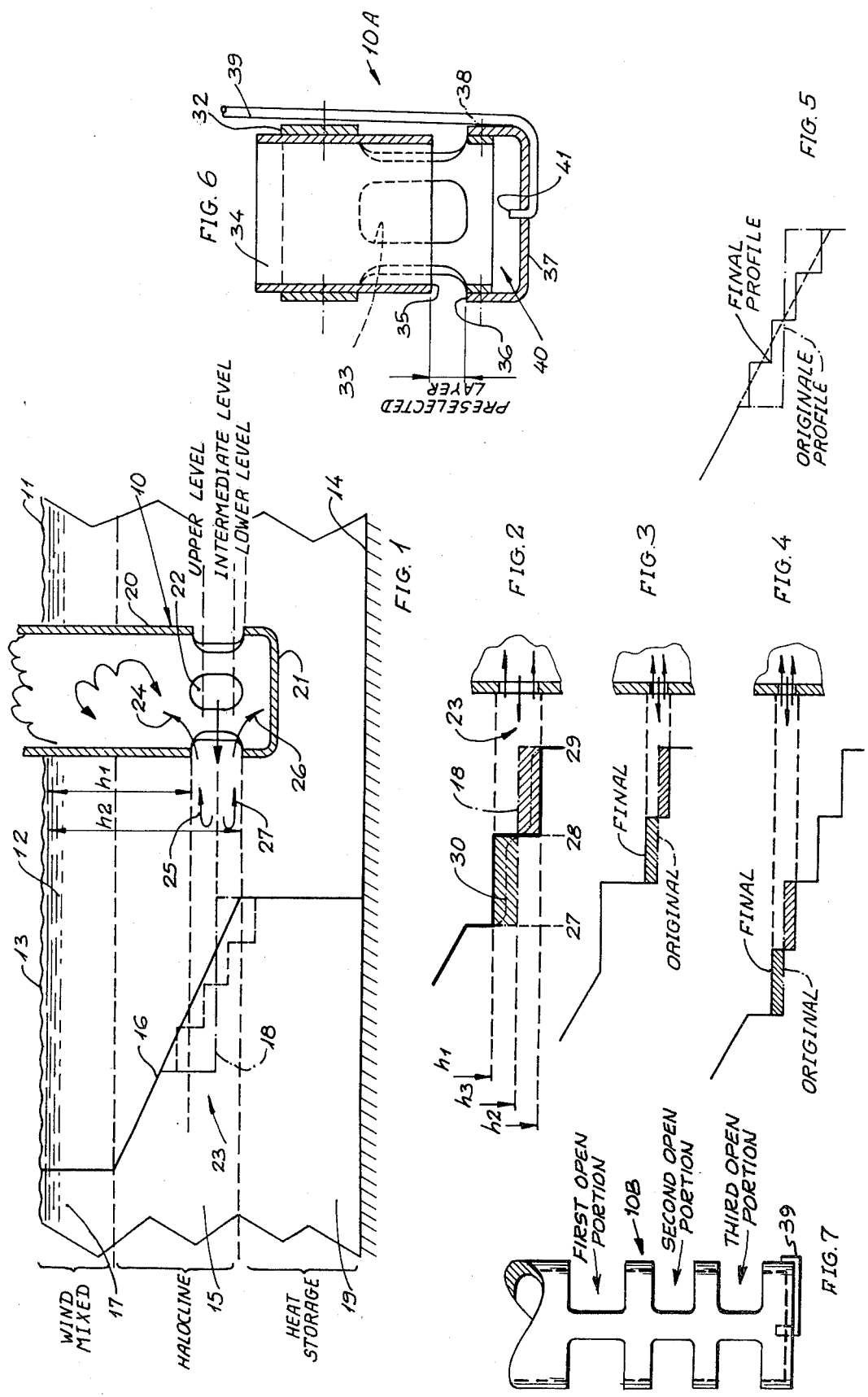

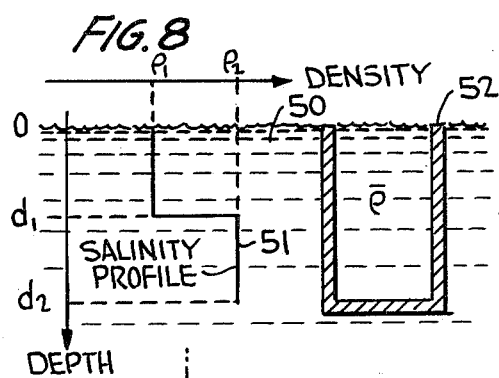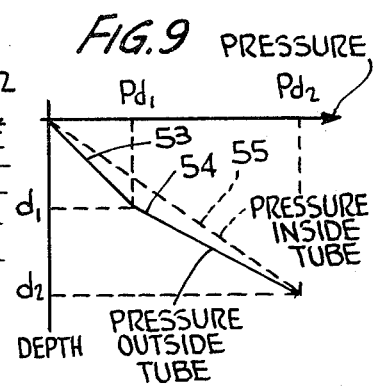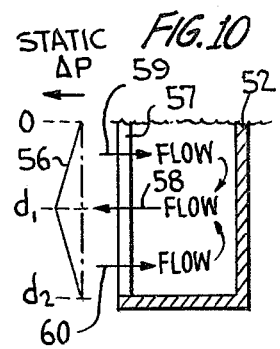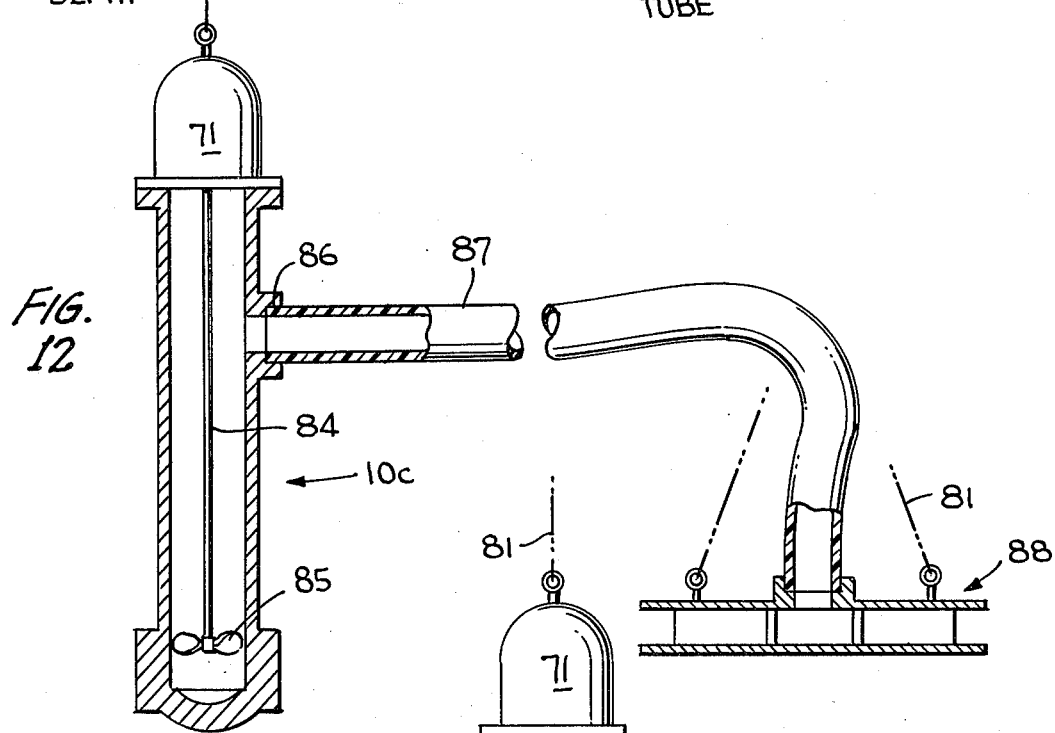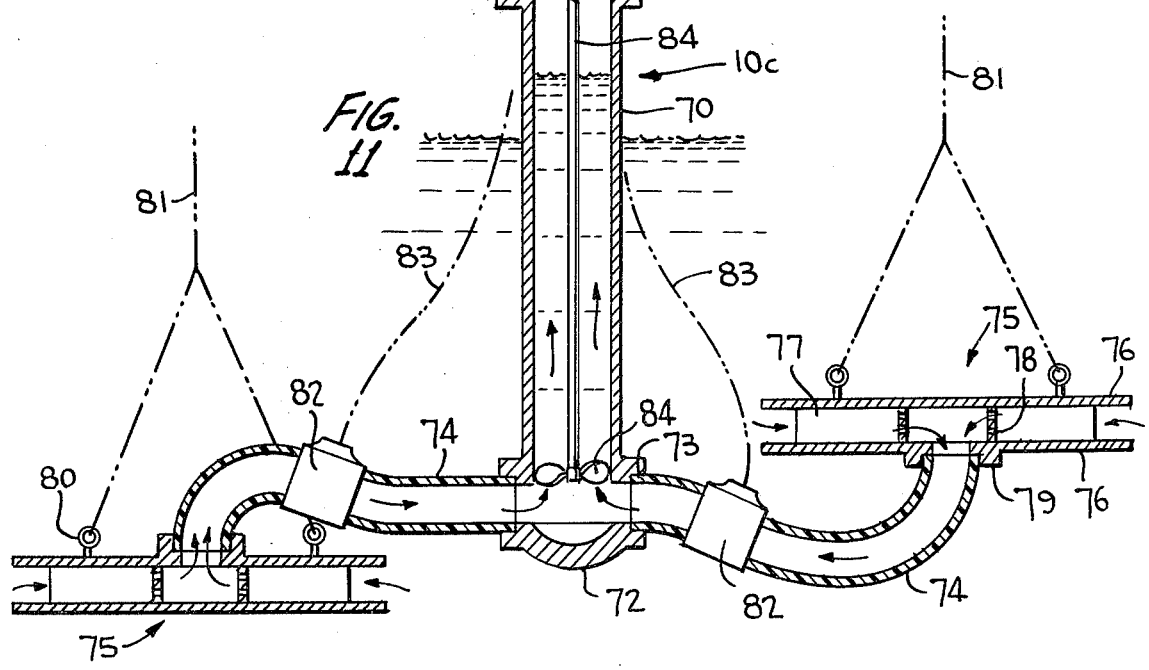

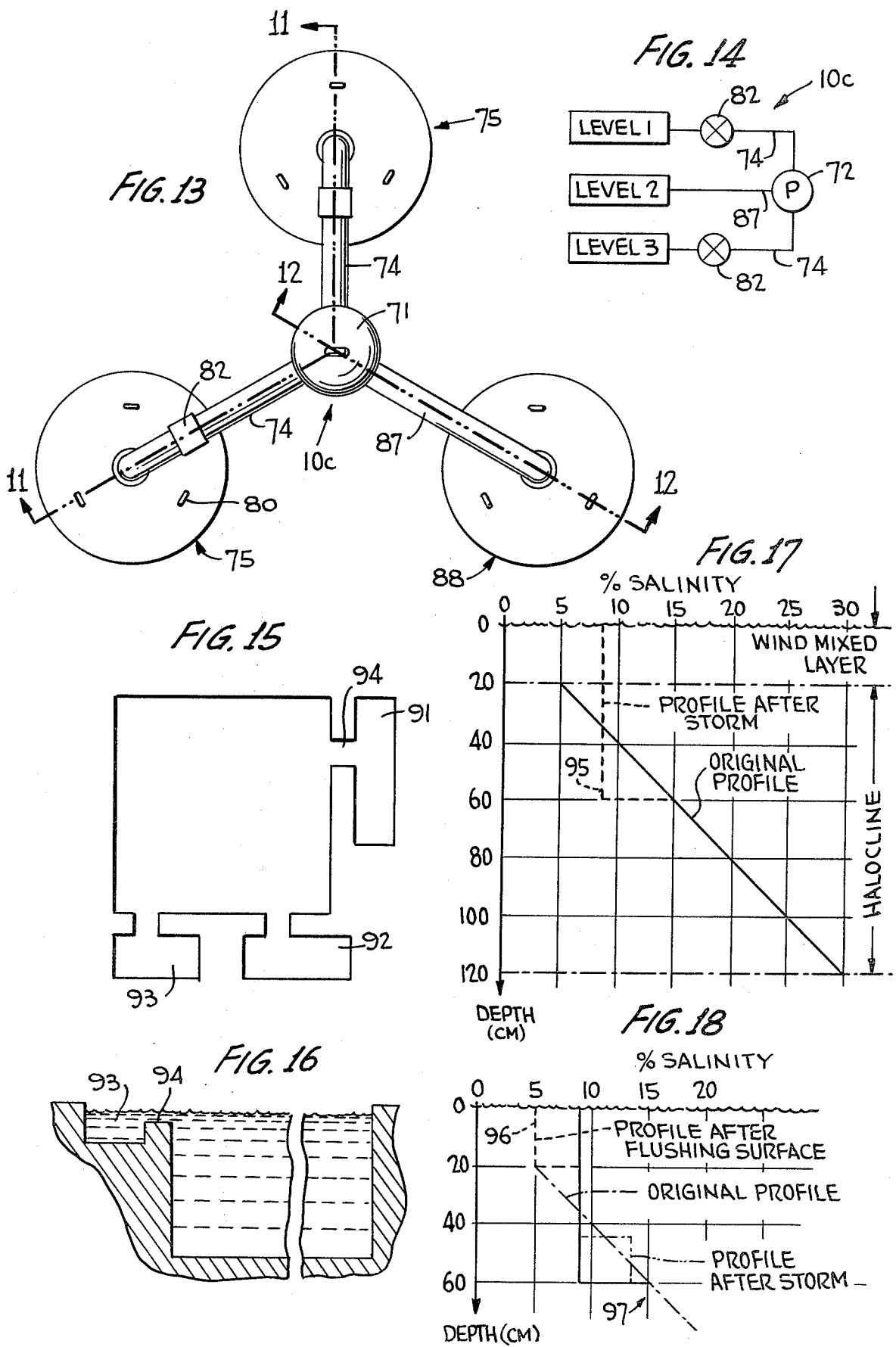

SELECTIVE MIXER FOR SOLAR POND AND METHOD OF USING SAME

RELATED INVENTION

This application is a continuation-in-part of copending application Ser. No. 889,987, filed Mar. 24, 1978, now abandoned.

DESCRIPTION

TECHNICAL FIELD

This invention relates to solar ponds of the type made non-convective by the provision of a halocline adjacent the surface of the pond, and more particularly to a method of and means for locally modifying the density profile of a preselected layer of halocline in a solar pond.

BACKGROUND OF INVENTION

A solar pond can be created by establishing an artificial halocline in a body of water adjacent to its surface. As is well known, the halocline has such a strong, downward salinity gradient that the resultant density profile also increases with depth event as the temperature increases in successive lower layers of the halocline. As a consequence, the halocline is a non-convective layer wherein heat conductivity is reduced to the molecular level. The halocline thus insulates a convective layer therebeneath, which acts as a heat storage layer. Absorption of solar radiation within the halocline and the heat storage layer can raise the temperature of the latter as high as 90–100 degrees Celcius.

Any action that significantly disturbs the density profile of the halocline, as for example, uncontrolled mixing within a layer of the halocline, will expose the heated brine to the atmosphere destroying the ability of the pond to function as a solar collector. Repairs to the density profile of the halocline can be carried out by preparing a brine of appropriate density, and then selectively injecting a predetermined amount of the brine into the pond at the depth at which repair is to be made, the density of such brine being predetermined in accordance with the degree of damage to the profile. This approach is difficult to carry out in practice, and often results in unwanted perturbations in the remainder of the halocline.

It is therefore an object of the present invention to provide a new and improved method and apparatus for locally modifying the vertical density profile of a halocline without significantly affecting the remainder of the halocline.

DISCLOSURE OF INVENTION

The density profile of a halocline, which increases monotonically with depth, is modified by drawing water from different levels of the halocline (and therefore of different densities) into a mixing chamber, mixing the water in the mixing chamber, and discharging the water from the mixing chamber into the halocline intermediate the levels from which the water is drawn. In one technique, a closed chamber is inserted into the halocline, the chamber having a vertically oriented slot defining a preselected layer of the halocline. The contents of the chamber are mixed to establish a uniform density equal to the average density of the water in the preselected layer. As a consequence, the vertical variation in density across the slot between the water inside and outside the chamber establishes a static pressure differential which causes water in the layer of the halocline to flow into and out of the chamber until the density of said layer is uniform. In another technique, water is pumped into a mixing chamber for two different levels in the halocline and discharged into the halocline intermediate the levels from which the water is drawn. With this arrangement, the density of the water in the mixing chamber can be adjusted in accordance with the relative amount of water pumped from each level.

Selective mixing described above is based on the transfer of concentrated brine from a lower level in the halocline to an upper level. However, concentrated brine in a halocline is difficult and expensive to create so it is not always desirable to use concentrated brine from the halocline to correct a discontinuity in the density profile thereof. If this is the case, an evaporating pond can be provided for producing water of a density found in the halocline at the level of the discontinuity. Water from this evaporation pond can be injected into the halocline at a depth where the discontinuity exists. This procedure will tend to raise the level of the solar pond and the surface water is drained into the same or another evaporation pond to maintain the level. The displaced surface water is then evaporated to produce concentrated brine for use at a later time when a further discontinuity in the halocline arises. Finally, the surface of the pond is flushed with less dense water, such as brackish seawater, and selective mixing can be carried out to more finely modify the density profile of the halocline.

BRIEF DESCRIPTION OF DRAWINGS

An embodiment of the present invention is shown in the accompanying drawings, wherein:

FIG. 1 is a sectional view of a mixer according to the present invention immersed in a solar pond and showing its relationship to the salinity profile in the pond;

FIG. 2 shows the first step in modifying the salinity profile;

FIGS. 3–5 show successive steps in further modification of the profile;

FIG. 6 shows a sectional view of one embodiment of the mixer according to the present invention;

FIG. 7 is an elevation of a second embodiment of the invention;

FIG. 8 is a schematic showing of a discontinuity in the density profile associated with a closed mixing chamber;

FIG. 9 is a plot showing the variation in static pressure inside and outside the chamber shown in FIG. 8;

FIG. 10 is a schematic showing of the mixing chamber of FIG. 8 but with a vertical slot for the purpose of showing the vertical variation in static pressure across the slot;

FIG. 11 is an elevation view of a third embodiment of a selective mixer according to the present invention taken along the lines 11—11 of FIG. 13;

FIG. 12 is an elevation of the third embodiment of the selective mixer taken along the lines 12—12 of FIG. 13;

FIG. 13 is a plan view of the third embodiment of the selective mixer;

FIG. 14 is a schematic view showing the manner in which the relative amounts of water drawn into the mixer can be selectively controlled;

FIG. 15 is a plan view of a solar pond and interconnecting evaporating ponds which provide concentrated brine for correcting discontinuities in the halocline;

FIG. 16 is a vertical elevation in section of the pond shown in FIG. 15;

FIG. 17 is a plot showing the variation in density as a function of depth of the wind mix layer in the halocline of the solar pond of FIG. 15 for the purpose of showing erosion of the halocline due to a storm; and FIG. 18 is a plot similar to FIG. 17 but showing the steps in correcting the profile.

BEST MODE PRESENTLY KNOWN FOR CARRYING OUT THE INVENTION

Referring now to FIG. 1, reference numeral 10 designates a mixer according to the present invention, the mixer being immersed in solar pond 11 which is a body of water having an upper surface 13 exposed to solar radiation and bottom 14. Salts dissolved in pond 11 establish a halocline 15 wherein the salinity greatly increases with depth at a uniform rate as indicated by salinity profile 16 shown by a solid line.

The halocline so established can be maintained by following any of a number of known procedures, such as by flash evaporating liquid drawn from the pond below the halocline and flushing the surface with fresh water (falling solar pond), introducing a salt solution beneath the halocline (rising solar pond), or by a combination of both techniques (standing solar pond) all as described in copending application Ser. No. 828,190 filed Aug. 26, 1977 in the name of Gad Assaf.

It is conventional to establish and maintain the halocline at a depth of from 1-2 meters (depending on the clarity and stability of the water), although in practical ponds, wind mixing at the surface will produce a wind-mixed layer 17 that may reach a depth of 10-20 centimeters wherein the salinity is uniform due to the mixing. In practical ponds, conditions sometimes arise, through mechanisms not fully understood at the present time, wherein the halocline becomes distorted as indicated schematically in FIG. 1 by the discontinuity 18 thereby reducing the thickness of the halocline and raising the thickness of the lower heat storage layer 19. In such case, the halocline becomes shallower than is desired, and a problem exists in quickly and conveniently redistributing the salt concentration in the pond in the region of the discontinuity without significantly affecting the salinity profile at other places.

Mixer 10 according to the present invention achieves this result by reason of its construction which is shown basically in FIG. 1. Mixer 10 comprises a tubular member 20 closed at its bottom end 21 defining a chamber closed to the pond when the mixer is immersed therein except for circumferentially spaced, vertically oriented, opening means in the form of openings 22 by which the interior of the chamber is connected to pond. The depth to which mixer 10 can be immersed is variable; and for reference purposes, openings 22 are shown as comprehending a range of depths from h1 to h2. If the central portion of the openings is aligned with the discontinuity 18, the upper portion of the openings will be aligned with a layer of the pond wherein the salinity is considerably less than the salinity in a layer just below the discontinuity, which layer is aligned with the lower portion of opening 22.

When mixer 10 is immersed as shown in FIG. 1, and no mixing takes place, the top open end of the mixer allows the liquid inside the mixer to rise to the level of surface 13. In such case, the vertical density distribution within the mixer will be the same as that in the pond. When mixing occurs inside chamber 20, either by a mechanical stirring of the contents of the mixer or by a rapid infusion of air at bottom 21, the density distribution will be destroyed and the liquid in the chamber will have a uniform density equal to the average density of the liquid. Immediately after mixing begins, the density of the liquid within the chamber will take on the average density of layer 23 comprehended between the depths h1 and h2 and aligned with openings 22.

The uniformly dense liquid inside the chamber and the vertically varying density of the liquid in layer 23 establish lateral forces on the liquid inside and outside the chamber within the layer, such forces promoting and sustaining a circulation of liquid in the layer so as to modify the density (i.e., salinity) profile in the layer in a predetermined and known manner.

The manner in which the lateral forces are established can be seen by referring to FIGS. 8-10. FIG. 8 shows a body of water 50 having a salinity profile 51 that increases monotonically with depth, the step-like nature of the profile being typical of a discontinuity in a halocline following erosion of the halocline due to a storm that thickens the wind-mixed layer. If chamber 52 is introduced into the body of water 50 without disturbing the salinity profile, the vertical salinity distribution within chamber 52 will match the salinity profile in the body of water. By closing the bottom of the chamber and mixing its contents, the density within the chamber will be the average density of the water in the vertical layer comprehended by the chamber. That is to say, the average density is given as follows:

$$\bar{\rho} = (\rho_1 + \rho_2)/2 \quad (1)$$

where $\rho_1$ and $\rho_2$ are the respective densities of the water at the depths d1 and d2 as measured from the surface of the body of water.

FIG. 9 shows the relationship between the pressure inside chamber 52 and the pressure outside as a function of depth. Specifically, the pressure of the water outside the chamber at the depth d1 is Pd1 given as follows:

$$P_{d1} = g\rho_1 d1 \quad (2)$$

wherein g is the gravitational constant, $\rho_1$ is the density in the upper level and d1 is the depth from the surface to the interface between the levels. Note that the pressure is a linear function of depth. The pressure at depth d2 is given as follows:

$$P_{d2} = g\rho_1 d1 + g\rho_2 (d2 - d1) \quad (3)$$

wherein d2 is the depth of the bottom of the chamber and $\rho_2$ is the density at that depth. Again, the variation in pressure with depth in the region from d1 to d2 is a direct function of the depth itself. Thus, curve 53 in FIG. 9 represents the variation in pressure with depth in the interval 0 to d1, while curve 54 represents the variation in pressure from the depth d1 to d2. As indicated above, the slope of the curves 53 and 54 depend upon the respective densities of the water in the region of interest.

Considering now the water inside the chamber 52, which is the average density of the water in the layer from 0 to d2, it can be seen that the pressure of the water at the bottom of the chamber will be exactly the same as the pressure of the water outside the chamber at the depth d2. This variation in pressure with depth is indicated by curve 55 in FIG. 9. From inspection of curves 53, 54 and 55, it can be seen that a pressure differential exists with depth across the walls of the chamber. This pressure differential is shown as curve 56 in FIG. 10, the pressure differential being the static pressure differential due to the difference in densities between the water inside and outside the chamber.

Assuming that a vertical slot 57 is provided in chamber 52, the presence of a static differential pressure between the water inside and outside the chamber as indicated by curve 56 will create flow patterns in the manner shown by the arrows in FIG. 10. That is to say, the net outward pressure at the depth d1 will cause an inherent flow outwardly (as indicated by arrow 58) of the liquid in the chamber into the body of water. The outward flow of water from the chamber is balanced by an inward of flow of water as indicated by arrows 59 and 60 in the regions above the depth d1 and in the region between depth d2 and d1. The only requirement to sustain this flow is to ensure that the density of the water within the chamber is always the average density. This situation can be attained by continually mixing the contents of the chamber. As long as the water outside the chamber at the depth between 0 and d2 is different from the density of the water inside the chamber (which is the average density of the layer of water between 0 and d2), the phenomenon described above will continue without the addition of any work except that required to mix the contents of the container. When all of the water in the layer 0 to d2 has the same density, further circulation in the layer will stop despite continuation of the mixing of the contents of the container.

From the above description of FIGS. 8-10, it can be seen that the vertical density profile of a solar pond can be modified by inserting into the pond a chamber having a vertically oriented opening means (e.g., slot 50) which defines a preselected layer (i.e., the layer 0 to d2), and mixing the water in the chamber to establish a uniform density therein whereby the vertical variation in density across the opening means between the water inside and outside the chamber establishes a vertical variation in pressure as shown in FIG. 9 which causes water in the layer to flow into and out of the chamber. The density of the layer can be made uniform with depth by continuing the mixing until this situation occurs.

Returning now to FIG. 1, the mixing of the contents of chamber 10 results in the flow patterns shown by the arrows in FIG. 1. Specifically, water in the upper and lower levels of layer 23 flows inwardly to the chamber while the intermediate level flows outwardly. That is to say, liquid in the upper portion of layer 23 flows into the chamber as indicated by arrow 24, and liquid in the lower portion of layer 23 flows into the chamber as indicated by arrow 26. The liquid flowing in is replaced by liquid in the chamber which flows outwardly as indicated by flow lines 25, 27. The resulting flow from the chamber is thus inwardly in both the upper and lower levels of layer 23, while the flow out of the chamber occurs in the central level of the layer intermediate the upper and lower levels. A circulation path is thus established in layer 23 which includes the interior of the chamber and extends laterally throughout the entire layer, the forces establishing and maintaining the circulation being entirely due to gravity. As a consequence of the above described circulation, a steady state condition is eventually reached throughout layer 23 as is shown in the solid lines in FIG. 2. That is to say, the density in the upper portion of layer 23 will have been raised from level 27 as shown in FIG. 2 to level 28, while the density in the lower portion of the layer will have been reduced from level 29 to level 28 wherein level 28 represents the average density of the layer both before and after mixing occurs. That is to say, the density in the upper portion of layer 23 will have increased by the same amount as the decrease in density in the lower level as illustrated by a comparison of the cross-hatched area above and below line 18 in FIG. 2.

It should be noted that the chain-lines in FIG. 2 represent a transient state of mixing using mixer 10 according to the present invention, the state of the density transition being illustrated by curve 30. Thus, mixing occurs as long as it is required to completely mix layer 23 throughout the entire pond; and no lateral shifting of the mixer is required to achieve this result. As soon as the steady state condition is reached, the effect of mixer 10 terminates even if the agiation within the mixer continues. That is to say, no further circulation is sustained within layer 23 once the steady state condition is reached. By controlling the duration of mixing to a time less than the time required to reach a steady state condition, the level of the steps introduced in this manner may be controlled in local regions of layer 23. In general, mixing within the chamber can be very intense but the mixing achieved within the layer is automatically controlled.

Once the indicated steps shown in FIG. 2 are introduced into layer 23, each single step can be further divided into two smaller steps as shown in FIGS. 3 and 4 provided the mixer is selectively raised or lowered in the pond and the vertical dimension of the openings in the chamber of the mixer are adjusted as indicated in the drawings. It should be noted that the vertical dimension of the opening for the purpose of carrying out the process shown in FIGS. 3 and 4 is only sufficient to effect the required changes without affecting the reaminder of the density profile.

When the operation illustrated in FIGS. 3 and 4 is completed, the profile shown in FIG. 1 in solid lines will have been changed to the profile shown in FIG. 5, the salinity having being rearranged to deepen the halocline without affecting the salinity at other levels in the pond. Finally, the sharp step-like nature of the profile created by the mixing operation will be somewhat unstable due to diffusion of salt with the result that a continuous profile will soon be established having the general slope determined by the steps.

In general operation, the salinity profile of a pond is known and the mixer will be introduced into the pond until the openings are at the depth where controlled mixing is to be achieved. The vertical dimension of the openings are pre-selected in accordance with the thickness of the layer whose profile is to be modified. Mixing is initiated and continues until the entire layer has the new steady state profile. No over mixing occurs because the circulation which is initiated and sustained by weight differences due to different densities between the liquid inside the chamber and the liquid outside the chamber, ceases as soon as the steady state condition is reached.

The preferred form of the mixer is illustrated in FIG. 6 to which reference is now made. Mixer 10A comprises a tubular sleeve 32 having a plurality of axially extending slots 33 which terminate just short of each axial end of the tube. Mounted inside the tube 32 is a slideably adjustable tube 34 partially closing the upper portion of slots 33. Specifically, the free end 35 of slotted tube 34 can be adjusted so as to be spaced from the end 36 of the slots in tube 32 so as to define a spacing equal to the desired spacing of a pre-selected layer within the pond whose salinity profile to be adjusted. Fasteners 37 passing between tubes 32 and 34 are used to maintain the tubes in their proper relative position after the spacing is selected.

Attached to the bottom of tube 32 is a cap 37 which is closed at its bottom end and is attached to tube 32 by fasteners 38 for the purpose of defining a fixed, closed end for tube 32. Compressed air line 39 passes outside the mixer 10A, around the bottom of cap 37, and terminates inside chamber 40 defined the tubes 32 and 34 and the cap 37 as indicated at 41.

When mixer 10A is immersed within the pond and compressed air is injected into line 39, the bubbling action occuring within the chamber 41 of the mixer is sufficiently turbulent to thoroughly mix the contents of the chamber without permitting the mixing action to escape through the openings defined by ends 35 and 36.

Alternatively, as shown in FIG. 7 by reference numeral 10B, the mixer can be constructed so that the vertically oriented opening means by which the interior of the mixer is connected to the water exterior to the mixer can be constituted by separate openings as distinguished from the situation shown in FIG. 1 where the opening means in constituted by a single opening. As shown in FIG. 7, mixer 10B has separate first, second and third open portions physically separate, one from the other. In the embodiments of FIGS. 1 and 2, the openings are contiguous, but it is also possible for the openings to be spaced vertically. In such case, the fluid in the level aligned with the top opening will be drawn into the mixer as will be the fluid in the level aligned with the bottom opening with the fluid being discharged at the second or intermediate level.

The present invention is also useful in creating a halocline when establishing a solar pond. In such application, the pond would be half-filled with water in which all of the salt to be used in the pond would be dissolved. The pond would be filled with water without extra salt thereby establishing separate upper and lower layers, each of uniform density, with the lower layer being considerably more dense than the upper layer. Consequently, a sharp density discontinuity exists at the interface between two the two layers. It is to the depth of this discontinuity that the mixer of the present invention is introduced until the center of the opening is aligned with the discontinuity. Operation of the mixer will establish two steps as indicated in FIG. 2. When creation of these steps is completed, the mixer depth is adjusted to permit each of these steps to be divided into two next steps. The process continues until the desired density profile is achieved.

The apparatus described above operates to exchange liquid between various layers within the helocline without altering the level of the pond. Another embodiment of this type of apparatus is shown in FIGS. 11-14 except that positive pumping power is incorporated in this embodiment. Apparatus 10c includes a mixing chamber in the form of tube 70 having at its upper end a flange on which motor 71 is mounted. The opposite end of the tube is provided with a chamber 72 having a pair of flanges 73 for receiving one end of respective flexible conduits 74. As shown in FIG. 13, the flanges 73 are spaced at 120 degrees.

The free end of each flexible conduit 74 is connected to inlet diffuser 75 in the form of a pair of parallel discs 76 spaced apart by webs 77 and containing a perforated central circular spacer 78 provided with apertures for effecting a fluid connection across the spacer. Conduit 74 is connected to boss 79 having an opening connecting the interior of the spacer 78 to mixing chamber 72 as indicated in FIG. 11.

To facilitate the design, bosses 73 are at the same level of the tube but diffuser 75, which are provided with eyelets 80, may be raised or lowered by means of flexible cables 81 connected to a derrick (not shown) which suspends the mixer in the water so that the two inlet diffusers 75 are at the proper level in the halocline.

Mounted in flexible conduit 74 is control valve 82 which is selectively operable by control cables 83 from the surface of the pond. This arrangement permits the flow within one of the flexible conduits to be adjusted relative to the flow in the other conduit.

Extending from motor 71 is shaft 84 which terminates in a propellor 85 in the region adjacent mixing chamber 72. Energization of the electric motor will cause propellor 85 to rotate thereby drawing water through conduits 74 into the tube 70 as indicated by the column of water within the tube. That is to say, water from two levels of the halocline flows into the two inlet diffusers and through the flexible cables into the mixing chamber 72 where the water is mixed together forming a mixture whose density is dependent upon the density of the water at the levels of the two inlet diffusers, and the relative amount of water drawn into the pump from each level.

Intermediate the length of the tube is outlet boss 86 (FIG. 12) which is connected by flexible conduit 87 to outlet diffuser 88 having a construction similar to the construction of the inlet diffuser 75. Water drawn up into the tube by the rotation of propellor 85 is discharged through conduit 87 into diffuser 88 which is held at a predetermined level by flexible cables 81.

Mixer 10c is shown schematically in FIG. 14 wherein water from levels 1 and 3 pass through valves 82 into the mixing chamber 72 and then into the intermediate level via conduit 87. In use, mixer 10c is suspended by flexible cables 81 in the solar pond with cables 81 operated to locate inlet diffusers 75 at the proper depths and also to locate outlet diffuser 88 intermediate the two inlet diffusers at the depth where the halocline profile is to be corrected. When energy is applied to motor 71, the mixing action takes place and more dense water is mixed with less dense water in the mixing chamber and delivered to the outlet conduit 87 where the water of intermediate density is injected into the halocline at the proper level. The energy required for motor 71 is very small inasmuch as the only work required is raising the water from the level of the lower diffuser to the level of the intermediate diffuser. Thus, it is possible to utilize an air-type of mixing chamber such as shown in FIG. 6 instead of the pump shown in FIGS. 11-13.

By reason of the difficulty and expense in creating concentrated brine in the halocline, it is not always desirable to utilize the very concentrated brine in the halocline to correct discontinuities. If this is the case, the arrangement shown in FIGS. 15, 16 can be used wherein a series of evaporating ponds is used for the purpose of creating concentrated brine of different densities to be used to correct perturbations in the density profile of the halocline. As shown in FIG. 15, a solar pond is indicated by a reference numeral 90 and the auxiliary evaporating ponds are indicated by reference numerals 91, 92 and 93, the latter being interconnected by causeways 94 (normally blocked) to the solar pond.

As shown in FIG. 16, causeways 94 are very shallow and in fact are provided to collect only surface water from pond 90. A plurality of evaporating ponds is provided so that water of different densities can be obtained by evaporation. A considerable amount of time is required to convert water of the salinity of the surface of the solar pond to the desired salinity for use in correcting the halocline. Thus, surface water will remain in the evaporating ponds becominning more and more concentrated as more and more water is evaporated. Pond 91 thus may contain the most concentrated brine associated with the lowermost portion of the halocline while the other two evaporating ponds may contain brines of intermediate concentration.

To understand the manner in which the brines from the evaporation ponds are used, reference is made first to FIG. 17 which shows a salinity profile of a typical solar pond wherein the first 20 centimeters is a wind mixed layer of relatively low salinity which may be similar to brackish or sea water. In the layer from 20 to 120 cm, the halocline is present and the desired profile is essentially linear increasing from say 5% to say 30% salinity. When a storm occurs, and the wind mixed layer becomes thicker, the result very often is as shown by profile 95 in FIG. 17. In order for the solar pond to operate efficiently, as a solar collector, it is necessary to reduce the thickness of the wind mixed layer by increasing the thickness of the halocline; and this is done by correcting the profile. The first step may be in flushing the surface of the pond with water fresher than the water in the wind mixed layer. Thus, sea water or brackish water can be used because it will have a salinity less than the salinity of the wind mixed layer. As a consequence, the profile will be altered in the manner shown by curve 96 in FIG. 18. Now the problem is to introduce water of a salinity greater than the salinity at the breakpoint 97 and water of this salinity is to found in one of the evaporation ponds. Because this water is denser than the water in the wind mixed layer, gravity will effect the transfer of the water into the halocline without the intercession of a pump. This will have the effect of raising the level 98 of the pond and the excess water can be drained into another evaporation pond for use in making concentrated brine to be used at a future time in correcting future perturbations to the salinity profile in the halocline.

The various mixers disclosed in the present application and the technique disclosed in FIGS. 17 and 18 provide a relatively simple may to control the salinity profile in the halocline and provide separate and distinct ways in which this can be done. Each of the techniques has its own advantage and it is considered that they will be used one in conjunction with the other.

It is believed that the advantages and improved results achieved by the apparatus of the present invention and achieved by the method and apparatus of the present invention are apparent from the foregoing description of the preferred embodiment of the invention. Various change and modifications may be made without departing from the spirit and scope of the invention as sought to be defined in the claims that follow.

I claim:

1. A method for modifying the vertical density profile of a halocline in a solar pond comprising the steps of inserting into the pond a chamber having vertically oriented opening means which defines a preselected layer of the halocline having a density that increases monotonically with depth and which connects the interior of the chamber to the layer, and mixing the water in the chamber to establish a uniform density therein whereby the vertical variation in density across the opening means between the water inside and outside the chamber establishes a pressure differential that varies vertically and which causes water in the layer to flow into and out of the chamber.

2. A method according to claim 1 including the step of continuing the mixing till the density of said layer is uniform.

3. A method for modifying the density profile of a halocline whose density increases monotonically with depth comprising the steps of:
(a) drawing water from different levels of the halocline into a mixing chamber;
(b) mixing the water in the mixing chamber; and
(c) discharging the water in the mixing chamber into the halocline intermediate the levels from which the water is drawn.

4. A method according to claim 3 including the step of utilizing the pressure head in the mixing chamber for discharging water from the mixing chamber.

5. A method according to claim 4 including the step of utilizing the pressure head in the mixing chamber for drawing water thereinto.

6. A method according to claim 5 wherein air is injected into the mixing chamber for mixing the contents.

7. A method according to claim 3 including the step of utilizing a pump for drawing water into the mixing chamber.

8. A method according to claim 7 including the step of selectively proportioning the rates at which water is drawn into the mixing chamber from the different levels.

9. A method for utilizing an elongated chamber having a closed end and provided with a side opening means to modify the vertical density profile of a halocline in a stratified solar pond, the method comprising:
(a) inserting the closed end of the chamber into the pond to a depth at which the opening means in the chamber lies at least in part within the halocline; and
(b) mixing the contents of the chamber.

10. A method according to claim 9 wherein the mixing is continued until the circulation in the pond initiated by the local mixing of the contents of the chamber is reduced to substantially zero.

11. In combination with a stratified solar pond having a halocline, a selective mixer for modifying the profile of the halocline, said mixer comprising:
(a) a chamber closed except for vertically oriented opening means arranged so that, when the chamber is in operative position in the pond, the opening means is connected to predetermined layers of the halocline; and
(b) means for mixing contents of the chamber when the latter is in operative position in the pond.

12. The combination of claim 11 wherein said opening means is constituted by separate openings.

13. The combination of claim 11 wherein said opening means is constituted by a single opening.

14. The combination of claim 11 wherein the opening means has a predetermined total vertical dimension associated with the thickness of the predetermined layer of the halocline.

15. The combination of claim 14 wherein the height of the opening is about 0.1 meters.

16. A selective mixer comprising a mixing chamber in the form of an elongated tube; a pair of inlet means to the mixing chamber, each inlet means being in the form of a diffuser vertically moveable relative to the mixing chamber; means for mixing the contents of the mixing chamber whereby liquid is drawn thereinto through the inlet means; and outlet means for discharging the contents of the mixing chamber, said outlet means being in the form of a diffuser vertically moveable relative to the mixing chamber, and wherein each of the diffusers is in the form of a pair of parallel, spaced plates, each one of which has a central aperture connected by a flexible connection to the mixing chamber.

17. A selective mixer according to claim 16 including means associated with the diffusers for adjusting their vertical positions relative to the tube.

18. A selective mixer according to claim 17 including selectively operable valves in the flow path between the diffuser associated with the inlet means for selectively adjusting the flow rate therethrough.

19. A method for modifying the vertical density profile of a halocline in a solar pond having a wind mixed layer which is of uniform density and located at the surface of the solar pond, the method comprising the steps of providing at least one evaporating pond for producing uniformly dense water, and injecting water from said at least one evaporating pond into the halocline at a depth where the density is not greater than the density of the injecting water.

20. A method according to claim 19 including directing surface water from the wind mixed layer into an evaporation pond to maintain the level of the solar pond.

21. A method according to claim 19 wherein said at least one evaporating pond evaporates surface water from the wind mixed layer.

22. A method according to claim 19 including the step of flushing the surface of the solar pond with water less dense than the wind mixed layer.

23. In a selective mixer for modifying the vertical density profile of the halocline of a solar pond, the mixer having an elongated tubular member defining a mixing chamber and having means for mixing the contents of the chamber the improvement being in that the bottom end of the tubular member is closed and the sides of the tubular member have a pair of vertically disposed inlet openings and an outlet opening allowing the mixer to be inserted into the pond closed end first until predetermined layers of the halocline are connected to the chamber by the openings whereby liquid from the halocline is drawn into the mixing chamber through the inlet openings and the contents of the mixing chamber are discharged through the outlet means.

24. A selective mixer according to claim 23, the improvement comprising means for adjusting the sizes of the openings.

25. A selective mixer according to claim 23, the improvement being in that each of said openings is separate.

26. A selective mixer according to claim 23, the improvement being in that said openings are contiguous.

27. A selective mixer according to claim 23, the improvement being in that said openings have a predetermined total vertical dimension associated with the thickness of the predetermined layer of the halocline.

28. A selective mixer according to claim 27, the improvement being in that said total vertical dimension is about 0.1 meters.

29. A selective mixer according to claim 23, the improvement being in that each of the inlet openings is in the form of a diffuser vertically moveable relative to the mixing chamber.

30. A selective mixer according to claim 29, the improvement being in that the outlet opening is in the form of a diffuser vertically moveable relative to the mixing chamber.

31. A selective mixer according to claim 30, the improvement being in that the means for mixing is a pump.

32. A selective mixer according to claim 31, the improvement being in that means are provided for selectively adjusting the ratio of liquid entering the mixing chamber via the pair of inlet openings.

33. A selective mixer according to claim 32, the improvement being in that each of the diffusers is in the form of a pair of parallel, spaced plates, each one of which has a central aperture connected by a flexible connection to the mixing chamber.

34. A selective mixer according to claim 33, the improvement being in that means are associated with the diffusers for adjusting their vertical positions relative to the tube.

35. A selective mixer according to claim 34, the improvement being in that selectively operable valves are provided in the flow path between the diffusers associated with the inlet means for selectively adjusting the flow rate therethrough.

36. A method for using the mixer of claim 31 to modify the vertical density profile of a halocline in a solar pond having a wind mixed layer which is of uniform density and located at the surface of the solar pond, said method including providing at least one evaporating pond for producing uniformly dense water, drawing water from said at least one evaporating pond into the mixer through an inlet diffuser, and injecting water into the halocline through the outlet diffuser at a depth where the density is not greater than the density of the injecting water.

37. A method according to claim 36 including the step of directing surface water from the wind mixed layer into an evaporation pond to maintain the level of the solar pond.

38. A method according to claim 36 including using said at least one evaporating pond to evaporate surface water from the wind mixed layer.

39. A method according to claim 36 including flushing the surface of the solar pond with water less dense than the wind mixed layer.

40. A method for modifying the density profile of a halocline using the mixer of claim 23, including drawing water into the chamber through the inlet openings from different levels by the mixing action in the chamber, and discharging water from the chamber into the halocline intermediate the levels from which the water is drawn.

41. A method according to claim 40 including the step of utilizing the pressure head in the mixing chamber for discharging water from the mixing chamber.

42. A method according to claim 41 including the step of utilizing the pressure head in the mixing chamber for drawing water thereinto.

43. A method according to claim 42 wherein air is injected into the mixing chamber for mixing the contents.

44. A method according to claim 43 including the step of utilizing a pump for drawing water into the mixing chamber.

45. A method according to claim 44 including the step of selectively proportioning the rates at which water is drawn into the mixing chamber from the different levels.

* * * * *

UNITED STATES PATENT AND TRADEMARK OFFICE
CERTIFICATE OF CORRECTION

PATENT NO. : 4,336,999
DATED : June 29, 1982
INVENTOR(S) : Gad ASSAF

It is certified that error appears in the above-identified patent and that said Letters Patent is hereby corrected as shown below:

```
Column 2, line 4,  "for" should be --from--.
Column 6, line 36, "reaminder" should be --remainder--.
Column 7, line 3,  after "profile" insert --is--.
Column 7, line 26, "in" should be --is--.
Column 7, line 55, "helocline" should be --halocline--.
Column 9, line 37, after "to" insert --be--.
Column 9, line 49, "may" should be --way--.
Column 9, line 59, "change" should be --changes--.
```

Signed and Sealed this

Twenty-sixth Day of October 1982

[SEAL]

Attest:

Attesting Officer

GERALD J. MOSSINGHOFF
Commissioner of Patents and Trademarks